United States Patent [19]
Vaitzblit et al.

[11] Patent Number: 5,528,513
[45] Date of Patent: Jun. 18, 1996

[54] SCHEDULING AND ADMISSION CONTROL POLICY FOR A CONTINUOUS MEDIA SERVER

[75] Inventors: Lev Vaitzblit, Concord; Kadangode K. Ramakrishnan, Maynard; Percy Tzelnic, Concord, all of Mass.

[73] Assignee: Digital Equipment Corp., Maynard, Mass.

[21] Appl. No.: 148,114

[22] Filed: Nov. 4, 1993

[51] Int. Cl.$^6$ .................................................. G06F 15/20
[52] U.S. Cl. ................................. 364/514 A; 364/281.8; 395/650
[58] Field of Search ............................ 364/514, DIG. 1, 364/230.3, 281.8, 401; 395/154; 370/60, 94.1, 85.6, 85.15; 348/6, 7

[56] References Cited

U.S. PATENT DOCUMENTS

| | | | |
|---|---|---|---|
| 3,639,912 | 2/1972 | Campbell | 364/DIG. 1 |
| 4,177,513 | 12/1979 | Hoffman et al. | 364/DIG. 1 |
| 4,642,756 | 2/1987 | Sherrod | 364/281.8 |
| 4,920,432 | 4/1990 | Eggers et al. | 364/514 |
| 5,014,265 | 5/1991 | Hahng et al. | 370/60 |
| 5,111,391 | 5/1992 | Fields et al. | 364/401 |
| 5,163,046 | 11/1992 | Hane et al. | 370/60 |
| 5,168,353 | 12/1992 | Walker et al. | 348/6 |
| 5,210,872 | 5/1993 | Ferguson et al. | 395/650 |
| 5,231,633 | 7/1993 | Hluchyj et al. | 370/94.1 |
| 5,261,099 | 11/1993 | Bigo et al. | 395/650 |
| 5,268,900 | 12/1993 | Hluchyj et al. | 370/85.6 |
| 5,291,481 | 3/1994 | Doshi et al. | 370/94.1 |
| 5,293,620 | 3/1994 | Barabash et al. | 395/650 |
| 5,325,526 | 6/1994 | Cameron et al. | 395/650 |

*Primary Examiner*—Ellis B. Ramirez
*Attorney, Agent, or Firm*—A. Sidney Johnston; Christine M. Kuta

[57] ABSTRACT

A scheduler with admissions control in a continuous media file server is presented. The scheduler supports multiple classes of tasks with diverse performance requirements. The scheduler is based on a combination of rate-monotonic and weighted round-robin scheduling schemes. Scheduling is accomplished in a hierarchical manner. Isochronous tasks have the highest priority and are scheduled first followed by real-time and general-purpose tasks. Isochronous tasks run periodically and are invoked by a timer interrupt set for each task. After scheduling the isochronous tasks, the scheduler alternates between the real-time tasks and the general-purpose tasks using a weighted round-robin scheme.

18 Claims, 5 Drawing Sheets

SCHEDULING AND ADMISSION CONTROL POLICY FOR A CONTINUOUS MEDIA SERVER

FIELD OF THE INVENTION

The present invention relates generally to the efficient operation of communication networks and, more particularly, to scheduling mechanisms for use in continuous media applications.

BACKGROUND OF THE INVENTION

Distributed multimedia and continuous media applications, enabled by high-speed networks and switching technologies, include collaborative work systems, authoring systems, conference and distance learning systems, and interactive video.

One particular distributed multimedia application is video-on-demand, an application which requires a specialized server capable of supporting a large number of real-time continuous media streams. Most of the current methods of providing video-on-demand focus on designing the physical file system to support continuous media and on providing real-time guaranteed access to storage devices. The current methods are concerned with providing adequate storage device bandwidth to meet the requirements of the admitted multimedia streams. This approach, however, is incomplete in that it does not address the need of scheduling the CPU resources. Coordinated operation of the CPU, the memory and network transmissions of a video file server is needed. Further, a successful video-on-demand system needs to support multiple classes of traffic with diverse performance requirements.

The presence of traffic with diverse performance requirements in a video-on-demand system arises from the need to support both the real-time continuous media streams as well as interactive and unsolicited requests from the network. Real-time streams such as audio/video playback are periodic, time sensitive requests. Real-time streams require performance guarantees for high-throughput, bounded delay and low jitter. Real-time streams need to finish a given task at a particular time and the data needs to be paced as promised to the source requesting the task. Interactive requests, such as background file reads and writes across the network, are characterized by random arrival of requests. Interactive requests have a tolerance for bandwidth and delay variations but do require an adequate response time. The system has to provide some amount of service to the interactive requests even though timing of service is somewhat flexible compared to servicing real-time requests.

A conventional network based file server is not well suited to function as a video file server. The main reason is that conventional file servers are designed for small data files whose usage and semantics are fundamentally different from those of real-time continuous media objects. Real-time audio and video streams possess temporal characteristics that are not found in conventional data. The temporal characteristics of audio and video data are isochronous in nature. That is, finite sized samples must be generated and transmitted at fixed intervals. The isochronous nature of audio and video streams imposes a stringent requirement for sustained throughput, that is, guaranteed delivery of a sample, or a burst of samples, with bounded delay between successive samples or bursts. Unlike conventional file servers that provide access to resources on a best-effort basis, a video file server needs to allocate resources via a reservation scheme, in order to provide guaranteed throughput and bounded delay to each admitted client.

In addition to the problems associated with scheduling isochronous data, the usual scheduling problems of preventing livelocks, and maintaining fairness and stability under overloads need to be handled. Prior art does not address the issues of scheduling multiple classes of tasks with diverse performance requirements and admissions control for access to system resources of a file server.

It remains desirable to have a communications system which accommodates traffic with diverse performance requirements, maintains performance guarantees and remains stable during overloads, while achieving high utilization of system resources.

SUMMARY OF THE INVENTION

The problems of achieving high utilization of system resources, while maintaining performance guarantees of sustained throughput, bounded latency and minimal jitter in a distributed media application are solved by the present invention of a continuous media server having a scheduling and admission control policy. The system scheduler is based on a combination of rate-monotonic and weighted round-robin scheduling schemes. Scheduling is accomplished in a hierarchical manner. Isochronous tasks have the highest priority and are scheduled first followed by real-time and general-purpose tasks. Isochronous tasks run periodically and are invoked by a timer interrupt set for each task. After scheduling the isochronous tasks, the scheduler alternates between the real-time tasks and the general-purpose tasks using a weighted round-robin scheme.

BRIEF DESCRIPTION OF THE DRAWINGS

The present invention together with the above and other advantages may best be understood from the following detailed description of the embodiments of the invention illustrated in the drawings, wherein.

DETAILED DESCRIPTION

Figure 1:
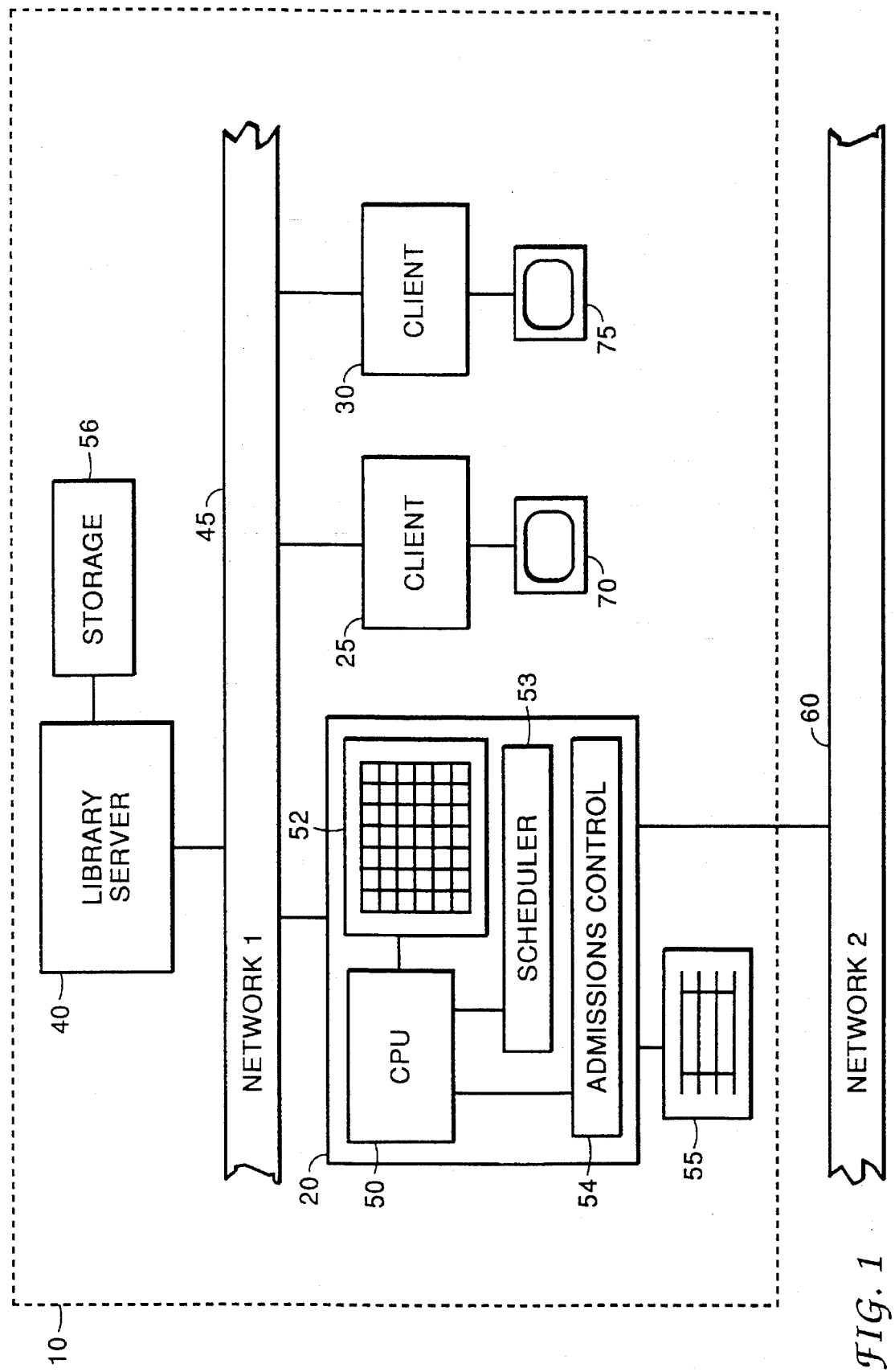
FIG. 1 shows a communications system with a continuous media server.

Referring now to the drawings, FIG. 1 shows a communications system with a continuous media server, specifically, a video-on-demand system with a video file server. The video-on-demand system 10 has a video file server 20 connected to client systems 25, 30 and a library server 40 via a high bandwidth network 45. The video file server 20 has a CPU 50, a memory 52, a scheduler 53, an admissions control apparatus 54 and a secondary storage device 55 and is attached to a second high bandwidth network 60. The library server 40 has a storage device 56. Each client system 25, 30 has a user display device 70, 75. The library server 40 and the attached storage device 56 may, in an alternative embodiment, be attached to the second high bandwidth network 60.

Client applications interact with the file server 20 using a file access protocol designed to support a VCR-like functionality. Commands are provided to start, pause, restart, and reposition a video playback stream. The video file server 20 maintains video material in hierarchical storage. The majority of videos reside in the storage device 56 connected to the library server 40. The storage device 56 is a slow access tertiary storage device such as tapes or optical disks, while a small set of frequently requested videos is cached in the secondary storage device 55, a fast access storage device such as a magnetic disk. The main function of the video file server 20 is to retrieve and transmit requested video material as synchronized real-time digital audio and video streams. An auxiliary function is to service a cache miss by loading a video from tertiary to secondary storage.

Scheduler

The video file server 20 has a scheduler 53 which allows for performance guarantees for the real-time streams to be maintained in the presence of randomly varying and unpredictable interactive and requests. The scheduler 53 prevents a misbehaving or malfunctioning stream from infringing on the resources committed to other streams. Further, the scheduler 53 ensures that the system remains stable during overloads and does not degrade its performance. Performance guarantees given to real-time streams are observed and maintained even during overload conditions.

The design of the scheduler 53 is based on a combination of weighted round-robin and rate monotonic scheduling algorithms. Three classes of schedulable tasks are supported: general-purpose, real-time and isochronous. A high-level view of these tasks is shown in FIG. 2, where the video server 20 has all three types of tasks running in it.

The general-purpose class 100 supports preemptive tasks that are suitable for low-priority background processing. In order to ensure that general-purpose tasks can always make progress, the general-purpose class is granted a minimum CPU processing quantum. In FIG. 2, the general-purpose tasks with their quantum of CPU time are shown as threads, THREAD1 102, THREAD2 104 and THREADn 106 in a queue called the GP ready queue 108. There may be many general-purpose class tasks in the server 20, all of which need to make progress in order for the server 20 to function.

The real-time class 120 is suitable for tasks that require guaranteed throughput and bounded delay. Real-time tasks are not preemptive, however, a software provision is made to allow for the existence of safe preemption windows in which higher priority isochronous tasks can be executed. In one embodiment of the invention, real-time tasks are used to implement polling device drivers and communication stacks. The method of polling for pending work, as opposed to interrupt-driven processing, contributes to system stability and alleviates most of the problems that arise during overloads.

Figure 2:
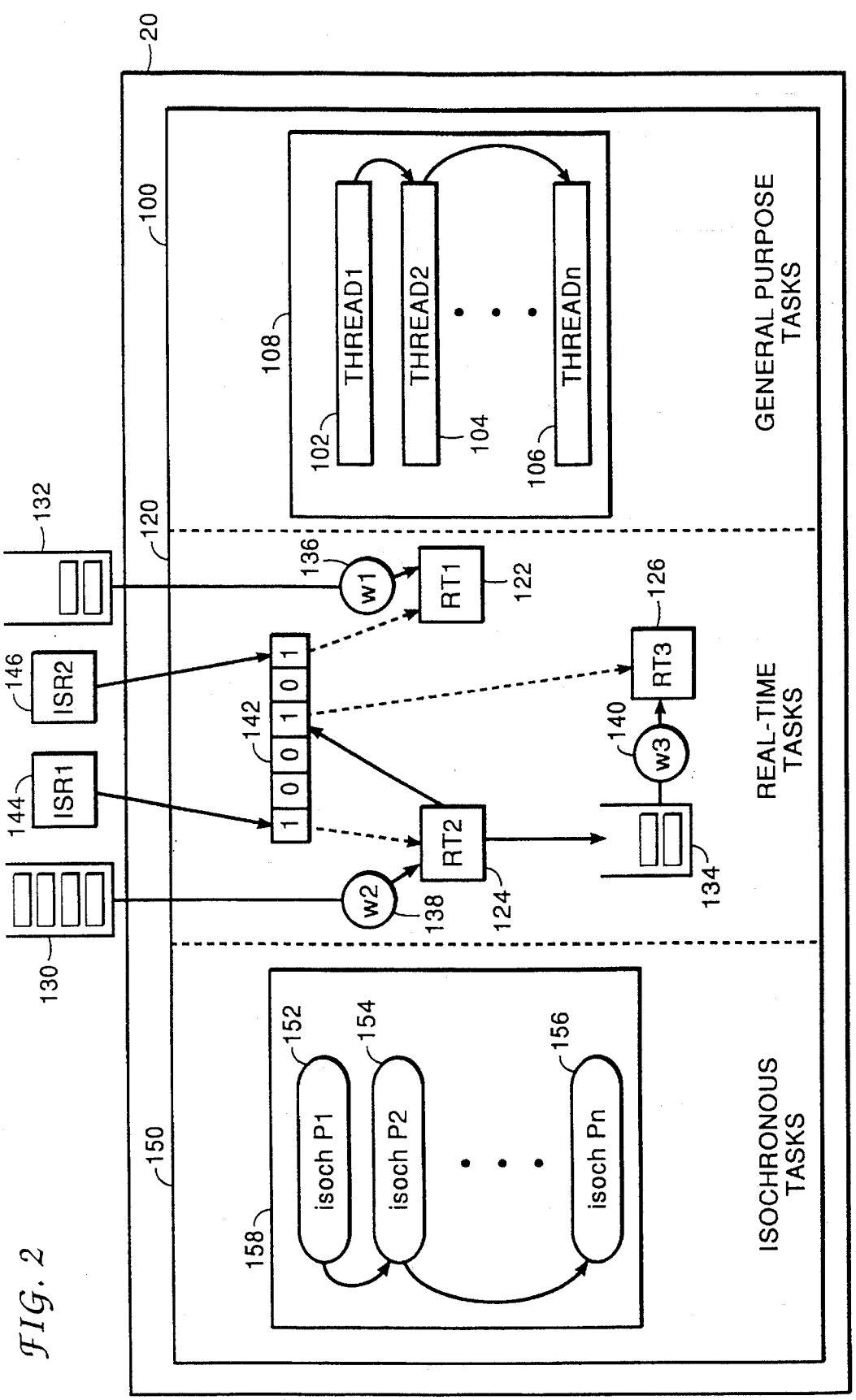
FIG. 2 shows a diagram of schedulable tasks in a server.

FIG. 2 shows three real-time tasks, RT1 122, RT2 124 and RT3 126. RT1 122 and RT2 124 arrived at the server 20 through a first network interface 130 and a second network interface 132. RT2 124 is directed toward a queue 134, internal to the server 20, from which RT3 126 is emerging. The scheduler 53 assigns a weight to each real-time task. RT1 122 has weight w1 136; RT2 124 has weight w2 138; and, RT3 126 has weight w3 140. Real-time tasks are defined to run for a limited time before yielding control to the scheduler 53. Each real-time task is defined to process a selected number of units of work, such as packets, and this number of units is calculated to be equivalent to a desired run time for the real-time task. Calculation of the number of units to process, or the "weight" of the real-time task, is based on throughput requirements relative to the other real-time tasks. The weight is used as the means to limit the amount of processing time taken by the real-time task at each invocation.

Each real-time task is also assigned a scheduling flag. A block of scheduling flags 142 is shown in FIG. 2. A scheduling flag is used to indicate that a task has pending work and to signal the scheduler 53 that the task needs to be invoked. Scheduling flags may be set by interrupt service routines or by tasks of any class. In FIG. 2, interrupt service routine ISR1 144 sets the scheduling flag for RT2 124. Interrupt service routine ISR2 146 sets the scheduling flag for RT1 122. Real-time task RT2 124 sets the scheduling flag for RT3 126.

The isochronous class 150 supports periodic tasks that require performance guarantees for throughput, bounded latency, and low jitter. In the present embodiment of the invention, isochronous tasks include the transmission of audio and video frames. Low jitter reduces the amount of buffering needed at the client, which in turn improves the response time of interactive video applications. The isochronous tasks that support streams of different periods are assigned priorities on a rate-monotonic basis, that is, a task with a higher frequency has a higher priority. In FIG. 2, the isochronous tasks isoch P1 152, isoch P2 154 and isoch Pn 156 are shown in a queue called the isochronous ready queue 158. The task isoch P1 152 has higher priority than isoch P2 154 which has higher priority than all the succeeding tasks up to isoch Pn 156.

The scheduling is hierarchical in that a class of activity is scheduled first, and then individual tasks within that class are scheduled. Isochronous tasks run periodically, and are invoked by timer interrupts set for the corresponding time periods. The isochronous class is given the highest priority in the system, that is isochronous tasks always preempt real-time or general-purpose tasks. The scheduler 53 executes isochronous tasks from the isochronous ready queue 158, in which all the isochronous tasks that are ready to run are arranged in the order of decreasing priority. A task with the lowest period has the highest priority and resides at the head of the isochronous ready queue 158. An isochronous task is inserted in its appropriate place on the isochronous ready queue 158 upon arrival at the server 20. Isochronous tasks arrive at the expiration of every periodic timer. A unique periodic timer exists in the system for each distinct period among all the admitted isochronous tasks.

Whenever an isochronous task arrives at the server 20, the scheduler 53 determines whether a currently running task needs to be preempted. If the currently running task is a general-purpose task, it is preempted by the newly arrived isochronous task. If the currently running task is a real-time task, it will be preempted by the newly arrived isochronous task in the next preemption window. If the currently running task is of the isochronous class, the scheduler 53 compares its priority to that of the newly arrived isochronous task. If the priority of the current task is lower, it is preempted at the next preemption window by the isochronous task from the head of the queue. The preempted task is queued to the head of the queue, since by virtue of its being a previously running isochronous task, it had to have the highest priority of all the tasks waiting on the queue. The scheduler 53 continues to execute isochronous tasks until the isochronous ready queue 158 becomes empty. Whenever the isochronous ready queue 158 is empty, the scheduler 53 alternates between the real-time and the general-purpose classes using a weighted round-robin scheme.

Scheduling real-time tasks is done by scanning the set of scheduling flags 142 associated with the real-time tasks. For each flag that is set, the scheduler 53 invokes the corresponding task with the assigned weight as a parameter. The real-time task processes at most the number of work units equal to the task's weight. At the completion of each unit of work, the real-time task opens up the preemption window which is used by the scheduler 53 to run all the isochronous tasks that may have arrived in the time it took the real-time task to process one unit of work. Upon exhausting the allowed number, or fewer, of work units, or the weight, the task voluntarily returns to the scheduler 53. After having completed one round of scanning the flags and invoking the corresponding real-time tasks, the scheduler 53 switches to the general purpose class.

General purpose tasks that are ready for execution are placed on the GP ready queue 108, which is served in a round-robin fashion. If the GP ready queue 108 is empty, the scheduler 53 initiates a new round of servicing the real-time tasks. Otherwise, the scheduler 53 starts the general-purpose quantum timer, and activates the first task from the GP ready queue 108. The task runs until it blocks or the quantum timer expires. If the task blocks, its context is saved on a wait queue and the first task from the GP ready queue is restored for execution. If the quantum timer expires, the scheduler 53 saves the context of the currently running task at the end of the GP ready queue and switches to a new round of servicing the real-time tasks. The execution of the general-purpose tasks may be preempted one or more times by the isochronous tasks. The execution of the general-purpose class continues after each preemption until the total time spent in processing general-purpose tasks reaches the guaranteed quantum.

In the absence of isochronous tasks, the scheduler 53 can provide guarantees on throughput and delay bounds for real-time tasks, assuming that all requests destined for a real-time task generate a constant amount of work. A maximum service delay is the time it takes to complete one round of real-time tasks scheduling plus the general purpose time quantum. Let R denote this maximum service delay in steady state. Weights may be assigned to real-time tasks to allocate and guarantee bandwidth averaged over the maximum service delay, R. If W denotes the weight given to a real-time task, the number of units of this task, or requests, processed in one round, then the task's steady state throughput is (W/R) requests per unit time.

The scheduling mechanism ensures system stability when the system is overloaded. The system performance will not degrade during transient bursts of unpredictable traffic from the network, even if the bottleneck resource such as the CPU or the memory are saturated. Performance guarantees for minimum throughput given to real-time tasks will not be violated during these periods of overload.

However, the scheduling mechanism alone does not preclude the server from overcommitting its resources by having too many concurrently active tasks. Isochronous streams require precise guarantees of throughput, delay and limited jitter. The scheduling mechanism cannot meet the guarantees of delay and jitter for an unbounded number of isochronous streams. One mechanism to limit the delay for servicing an isochronous task is to provide priority for these tasks over the real-time and general purpose tasks. This is done in a controlled fashion but this only limits the delay suffered by isochronous streams as a result of lower priority real-time and general-purpose tasks in the system. Even for the higher priority isochronous tasks, there needs to be enough resources existing to fulfill the processing requirements and meet real-time guarantees. The admission control policy limits the number of active tasks to a feasibly schedulable set.

Operation of the Scheduler

Figure 3:
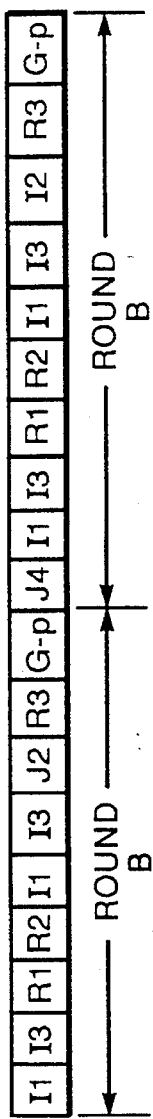
FIG. 3 shows a general timing diagram of the scheduler.

FIG. 3 shows an exemplary timing diagram of the scheduler. $I1, I2, I3, \ldots, I\_n$ are the set of isochronous tasks. Let $T_1, T_2, T_3, \ldots T_n$ be the associated periods. $R1, R2, R3, \ldots R\_n$ are the set of real-time tasks. $G\_p$ denotes a general purpose task. $D\_min$ is the smallest bound on latency tolerated by real-time tasks. The length of time of a scheduling round, B, is chosen as follows:

$$B = D\_min.$$

The general purpose class, $G\_p$, is assumed to need one unit of time of execution per time period B. Also, each of the real-time tasks is invoked for execution at least once in round time B.

A timer is set with a period of $T_i$ for each distinct value of $T_i$. FIG. 3 shows two rounds of an exemplary schedule of tasks. In FIG. 3, the isochronous tasks I1 and I3 are executed twice in each round. The isochronous task I2 needs to execute only once in each round and the isochronous task I4 executes once every two rounds. The isochronous tasks are scheduled through the use of each task's individual timer. The isochronous tasks may interrupt the execution of the real-time tasks when the isochronous time value expires. The isochronous task that is invoked by the interrupt services all the tasks that are scheduled to be executed when the timer expires. Thus, all isochronous streams that have the same period are executed on the expiration of the timer. To achieve a rate monotonic schedule, an isochronous task may be interrupted only by a higher priority isochronous task. The general-purpose and real-time tasks are interruptable by the isochronous tasks.

Since B is the bound for a round, it is important to limit the number of isochronous and real-time tasks which are executed in the round so that all scheduling requirement are met. Limiting the number of tasks is accomplished through the admissions control policy.

Admissions Control Policy

The admissions control policy ensures that a feasible schedule exists for all admitted tasks, that is, all the admitted tasks can be scheduled using the combination of rate monotonic and weighted round robin scheduling described above without violating any performance guarantees. The admissions control policy for access to processor resources balances the needs of the three classes of tasks: throughput and maximum delay requirements of the real-time tasks, a minimum guaranteed CPU quantum for the general-purpose tasks, and the periodic deadline-sensitive nature of the isochronous tasks.

The admissions control policy uses a time-based admission test for the isochronous tasks with an adjustment to account for tolerable delay constraints imposed by real-time tasks.

The admissions control policy consists of two tests. Isochronous tasks are admitted when both conditions are met. Real-time tasks are admitted when only the first condition is met.

The first conditions is:

$$\left( \sum_{i=1}^{n} c_i \cdot \lceil B/T_i \rceil \right) + \left( \sum_{j=1}^{m} w_j \cdot r_j \right) + Q \leq B$$

where $C_i$ is the run-time of isochronous task i, $T_i$ is the period of isochronous task i, $w_j$ is the weight assigned to real-time task j, $r_j$ is the run-time required by the real-time task j to process one request, and Q is the time quantum assigned to the general-purpose class, that is, the general-purpose class runs Q units of time every time interval of length B.

This first condition insures that all the admitted tasks can be run in the round time B.

The second condition is:

For i=1 to n $$\sum_{j=i}^{n} c_j \lceil T_i/T_j \rceil \leq T_i \qquad T_i \geq T_j | \forall j \geq i$$

where $C_j$ is the run-time for isochronous task j, $T_i$ is the period of isochronous task i, and $T_j$ is the period of isochronous task j.

This second condition insures that each isochronous task i and all other isochronous tasks of higher priority than that of task i can be run in time $T_i$, where $T_i$ is the period of isochronous task i.

Figure 4:
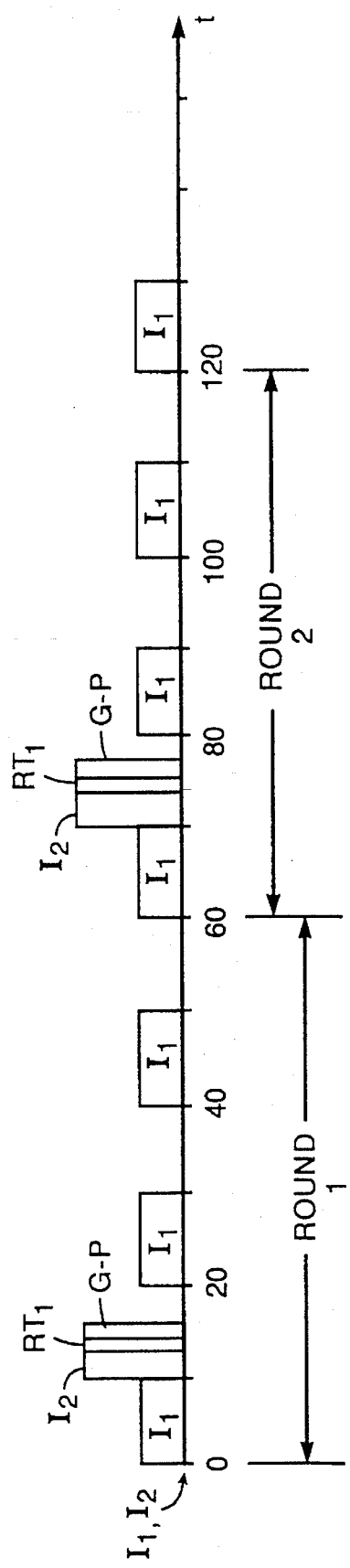
FIG. 4 shows a specific timing diagram of the scheduler.

FIG. 4 shows an exemplary timing diagram of the scheduler which can be used to illustrate the application of the two conditions of the admissions control policy. $I_1$ and $I_2$ are isochronous tasks. $I_1$ has a run-time $C_1$ of 10 msecs, and a period $T_1$ of 20 msecs. $I_2$ has a run-time $C_2$ of 4 msecs, and a period $T_2$ of 60 msecs. A real-time task RT1 has a run-time of 2 msecs and the quantum for general-purpose tasks is also 2 msecs. The round time B is 60 msecs. In this example, $I_1$ and $I_2$ arrive simultaneously at t=0.

$I_1$ has the higher priority of the two isochronous tasks since it has the smallest period. Therefore, $I_1$ is scheduled to run first. As indicated in FIG. 4, $I_1$ is scheduled to run for 10 msecs every 20 msecs starting from t=0. $I_2$ is scheduled to run for 4 msecs every 60 msecs in the first window available in the round, which is immediately after the first execution of $I_1$ in each round. The real-time task RT1 and the general-purpose tasks G_p are scheduled to run after the completion of $I_2$ for a total of 4 msecs. The time taken up in each round by the two isochronous tasks, the real-time task and the general-purpose tasks is 38 msecs, leaving 22 msecs free to receive other tasks.

Let there be a new isochronous task $I_3$ with a run-time $C_3$ of 11 msecs and a period $T_3$ of 30 msecs. Isochronous task $I_3$ needs to run twice each round for a total of 22 msecs. This new isochronous task satisfies the first condition of the admissions control policy which looks only at whether there is enough available time to run the task. However, $I_3$ does not satisfy the second condition of the admissions control policy. The second condition tests for the availability of large enough windows in which the isochronous task may run. $I_1$ remains the task of highest priority because it has a smaller period than either $I_2$ or $I_3$. Therefore, $I_3$ cannot preempt $I_1$, so $I_3$ must look for an 11 msec window in which to run. There is no 11 msec window available so isochronous task $I_3$ fails the second condition and will not be permitted to enter the schedule.

Figure 5:
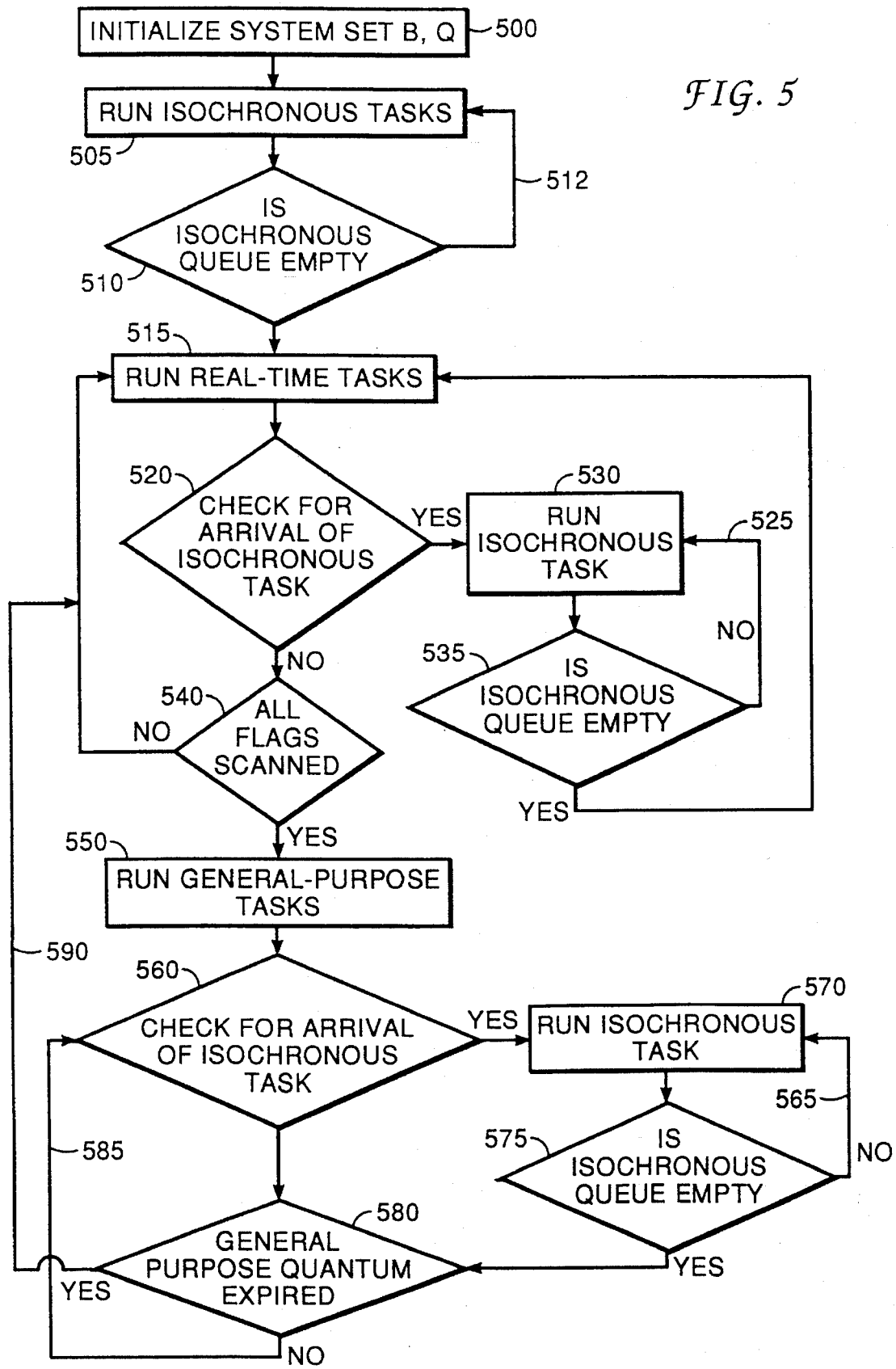
FIG. 5 shows a flow chart of the scheduling process.

FIG. 5 shows a flow chart of the scheduling process. First, the system is initialized and the time of a round, B, and the quantum for the general-purpose activities are set as indicated in block 500. Then, all the isochronous tasks from the isochronous ready queue are run as indicated in block 505 until the isochronous ready queue becomes empty, block 510 and loop 512. After emptying the isochronous ready queue, the scheduler scans the set of scheduling flags for the real-time tasks and invokes those real-time tasks whose flags are set, as indicated in block 515. At the completion of each unit of work, the invoked real-time task opens up a preemption window as indicated in block 520 which is used by the scheduler to run all the isochronous tasks as indicated in loop 525. In loop 525, all the isochronous tasks that arrived in the time it took the real-time task to process one unit of work are executed until the isochronous ready queue is once again empty, blocks 530, 535. When the isochronous ready queue is empty, the system returns to the interrupted real-time task, block 515. At the next preemption window, if there is no isochronous task in the isochronous ready queue, the real-time task scheduling flags are scanned for the next real-time task to be executed, block 540. Once all the real-time task scheduling flags have been scanned, the scheduler moves on to the general-purpose queue, block 550. At every system clock interrupt, the scheduler checks for the arrival of isochronous tasks as indicated in block 560. In loop 565, all the isochronous tasks that arrived since the time of the last system clock interrupt are executed until the isochronous ready queue is once again empty, blocks 570, 575. When the isochronous ready queue is empty, the system returns to the interrupted general purpose task, block 550. The general-purpose tasks continue to be executed until the quantum of time for general-purpose tasks is expired, block 580, loop 585. At the expiration of the general-purpose quantum, the scheduler returns to scanning real-time task scheduling flags, loop 590.

Figure 6:
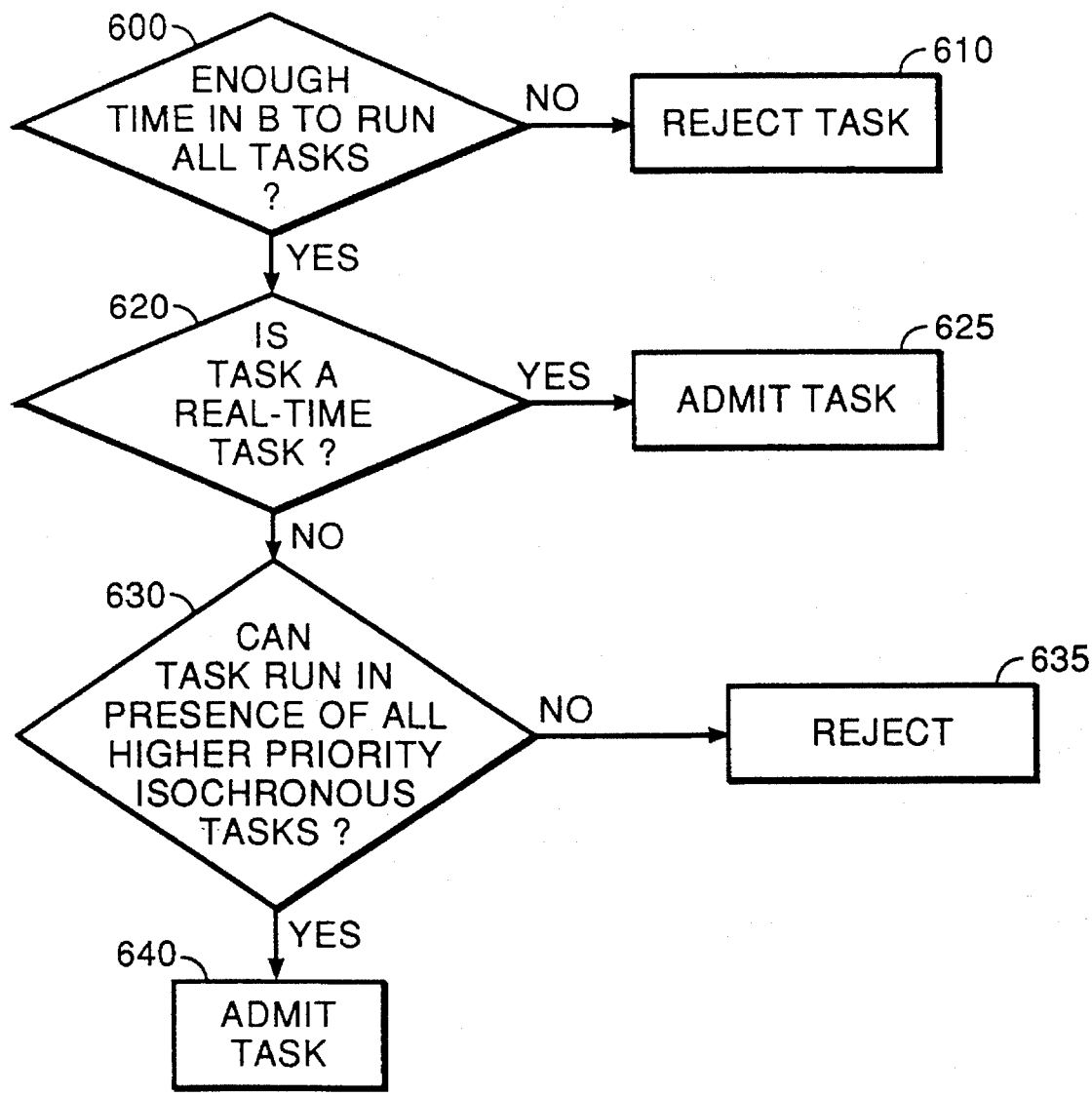
FIG. 6 shows a flow chart of the admissions control policy process.

FIG. 6 shows a flow chart of the admissions control process. The first step of the admissions control process is to determine whether all the admitted tasks can be executed in the round time, B, as indicated in block 600 of FIG. 6. If the time required to run all the admitted tasks is longer than the round time B, then the task is rejected, block 610. If the time required to run all the admitted tasks is less than or equal to the round time B, then a further decision is made based on whether the task to be admitted is isochronous or real-time, block 620. If the task to be admitted is a real-time task, then the task is admitted to the system, block 625. If the task to be admitted is an isochronous task, then a check is made to determine whether the task to be admitted and all the isochronous tasks of higher priority than the new task can be run in a time period T, where T is the period of the task to be admitted, block 630. If the task may not be run under this condition, then the task is rejected, block 635, otherwise, the task is admitted, block 640.

An alternative embodiment of the present invention is in an asynchronous transfer mode (ATM) network. ATM is a popular technology used for implementing multiservice broad band networks. An ATM network consists of end nodes which are host computers and intermediate network nodes which are known as ATM switches. An ATM switch routes short packets called cells between multiple virtual circuits.

An ATM switch may need to support traffic with diverse performance requirements such as constant bit rate video or audio traffic and variable bit rate bursty data traffic. The scheduling of traffic with diverse performance requirements in an ATM switch is similar to the problem of scheduling multiple classes of tasks that are addressed in a video-on-demand system described above. Therefore scheduling mechanisms that are presented above could be applied to scheduling the various classes of traffic in an ATM switch.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method for scheduling multiple tasks in a communications network, comprising:

providing a server for scheduling said tasks;

determining a first time interval during which said tasks are to be performed in said communications network;

scheduling isochronous tasks, said isochronous tasks being highest priority tasks, to begin at selected time points within said first time interval;

determining a plurality of free time intervals by identifying unused time in said first time interval which is not used by said isochronous tasks;

scheduling lower priority tasks to begin running during ones of said free time intervals.

2. The method as in claim 1, further comprising:

determining said plurality of free time intervals as fitting between ones of said isochronous tasks.

3. The method as in claim 1, further comprising:

testing a new isochronous task for admission into said multiple tasks for which scheduling is done by:

A. first, determining if there is enough said unused time for the new task to execute;

B. second, determining if there is enough time for the isochronous tasks including said new isochronous task to execute by themselves;

admitting said new isochronous task to be scheduled in the event that both condition A and B above are satisfied.

4. The method as in claim 1, further comprising:

testing a new lower priority task for admission into said multiple tasks for which scheduling is done by determining if there is enough said unused time for the new task to execute;

admitting said new lower priority task to be scheduled in the event that there is enough said unused time for the new task to execute.

5. The method as in claim 1, further comprising:

testing during selected time windows while execution of said lower priority tasks are executing to determine of an isochronous task is scheduled to begin;

preempting said lower priority task so that an isochronous task scheduled to begin does begin to execute.

6. The method as in claim 1 further comprising:

dividing said lower priority tasks into real-time tasks and general-purpose tasks, and assigning an intermediate priority to said real-time tasks and assigning a lowest priority to said general-purpose tasks;

preempting a general-purpose task by an isochronous task, to halt execution of said general-purpose task to permit said isochronous task to execute;

preempting a real-time task by an isochronous task, to halt execution of said real-time task to permit said isochronous task to execute.

7. The method as in claim 6, further comprising:

having said real-time task process a data packet being transmitted onto a network;

checking by said real-time task during predetermined time windows to determine if an isochronous task is scheduled to run, and halting operation of said real-time task in the even that an isochronous task is scheduled to run;

executing said isochronous task upon halting of said real-time task;

continuing execution of said real-time task upon completion of said isochronous task.

8. The method as in claim 1, further comprising:

checking by said general-purpose task at selected time windows to determine if an isochronous task is scheduled to execute;

preempting said general-purpose task in the event that an isochronous task is found to be scheduled to execute, and beginning execution of said isochronous task.

9. The method as in claim 1, further comprising:

executing said lower priority task in a plurality of said free time intervals in response to preemption by a task of higher priority.

10. The method as in claim 1, further comprising:

checking for preemption by an isochronous task handling frames for transmission on a network at the completion of processing each frame.

11. The method as in claim 1, further comprising:

checking by a general-purpose task for preemption at periodic time intervals.

12. The method as in claim 11, further comprising:

testing a flag by a task in order to check for preemption.

13. An apparatus for scheduling multiple tasks in a communications network, comprising:

a scheduler for establishing a schedule with rounds and windows, said scheduler scheduling a plurality of tasks in said schedule, each task of said plurality of tasks having a class and a priority, said scheduler scheduling each said task in said schedule first according to said class and then according to said priority; and, an admissions control apparatus admitting to said schedule each task of said plurality of tasks according to A. unused time left in said rounds, and B. windows available to accommodate said each task of said plurality of tasks.

14. An apparatus as in claim 13 wherein said plurality of classes tasks comprises:

an isochronous class, being the class highest in said hierarchy of classes, a real-time class, and, a general-purpose class.

15. An apparatus as in claim 14 wherein said real-time class and said general-purpose class are scheduled by said means for scheduling by a weighted round robin.

16. An apparatus as in claim 14 wherein said admissions control apparatus admits tasks of said real-time class when only condition A is satisfied, and admits tasks of said isochronous class when conditions A and B are satisfied.

17. An apparatus for scheduling multiple tasks in a communications network, comprising:

means for determining a first time interval during which said tasks are to be performed in said communications network;

means for scheduling isochronous tasks, said isochronous tasks being highest priority tasks, to begin at selected time points within said first time interval;

means for determining a plurality of free time intervals by identifying unused time in said first time interval which is not used by said isochronous task; and means for scheduling lower priority tasks to begin running during ones of said free time intervals.

18. The apparatus as in claim 17, further comprising:

means for testing a new isochronous task for admission into said multiple tasks for which scheduling is done, said means for testing having a means for determining if there is enough said unused time for the new task to execute, said means for testing having a means for determining if there is enough time for isochronous tasks including said new isochronous task to execute by themselves.

* * * * *